United States Patent [19]

Horie et al.

[11] Patent Number: 4,728,587
[45] Date of Patent: Mar. 1, 1988

[54] BATTERY USING HALOGEN AS ACTIVE MATERIAL

[75] Inventors: Toshio Horie; Yuichi Watakabe; Kunihiko Fujiwara, all of Tokyo, Japan

[73] Assignee: Furakawa Electric Co., Ltd., Tokyo, Japan

[21] Appl. No.: 875,868

[22] Filed: Jun. 18, 1986

[30] Foreign Application Priority Data

Jun. 19, 1985 [JP] Japan .................................. 60-133687
Nov. 1, 1985 [JP] Japan .................................. 60-246067
Jan. 21, 1986 [JP] Japan .................................. 61-10915

[51] Int. Cl.$^4$ ............................................. H01M 6/14
[52] U.S. Cl. ...................................... 429/101; 429/105; 429/199; 429/17; 429/51
[58] Field of Search .................. 429/12, 14, 17, 19, 429/199, 229, 101, 105, 120, 72, 51

[56] References Cited

U.S. PATENT DOCUMENTS

| | | | |
|---|---|---|---|
| 1,377,722 | 5/1921 | Marconi | 429/14 |
| 3,051,768 | 8/1962 | Kujas | 429/199 |
| 3,328,202 | 6/1967 | Riffe | 429/199 |
| 3,408,232 | 10/1968 | Blue et al. | 429/199 X |
| 3,607,421 | 9/1971 | Werth | 429/17 X |
| 3,713,888 | 1/1973 | Symons | 429/199 X |
| 3,809,578 | 5/1984 | Symons | 429/51 |
| 3,881,958 | 5/1975 | Carr et al. | 429/14 |
| 3,935,024 | 1/1976 | Symons | 429/17 X |
| 4,049,880 | 9/1977 | Hart | 429/199 X |
| 4,418,128 | 11/1983 | Fujii | 429/199 X |

FOREIGN PATENT DOCUMENTS

| | | |
|---|---|---|
| 1416023 | 12/1975 | United Kingdom . |
| 1416024 | 12/1975 | United Kingdom . |
| 1452199 | 10/1976 | United Kingdom . |
| 1485124 | 9/1977 | United Kingdom . |
| 1598834 | 9/1981 | United Kingdom . |
| 2109621 | 6/1983 | United Kingdom . |

Primary Examiner—Anthony Skapars
Attorney, Agent, or Firm—Birch, Stewart, Kolasch & Birch

[57] ABSTRACT

In a battery having a cathode in which a halogen is employed as an active material, the halogen is dissolved in an organic solvent such as a halogenated hydrocarbon, whereby the halogen is stored, and is utilized when needed. This battery can be applied as both a primary battery and a secondary battery. According to the battery of the present invention, a power required during the operation of the battery is reduced, whereby the total energy efficiency of the battery can be improved.

16 Claims, 7 Drawing Figures

BATTERY USING HALOGEN AS ACTIVE MATERIAL

BACKGROUND OF THE INVENTION (1) Field of the Invention

The present invention relates to a primary or a secondary battery using a halogen as a cathode (positive pole) active material in which the halogen is dissolved in an organic solvent so as to be stably stored and fed.

(2) Description of the Prior Art

In recent years, new types of batteries have been developed in compliance with requirements of various uses. As the batteries for storing electrical power, and batteries for electrically driven vehicles which can store a relatively large amount of electric power, batteries using a halogen have been developed. Typical examples include zinc/chlorine type and zinc/bromine type batteries. They can be used as both a primary and a secondary battery. However, it is their common problem as to how the halogen is stored and smoothly removed when needed.

Every halogen is a harmful gas, and thus it must be stored in a sealed container which is separated from the battery portion (U.S. Pat. No. 3,328,202). Particularly in the case of a chlorine gas which is gaseous at ordinary temperature, it must be kept in a bomb (U.S. Pat. No. 377,722). When this method is employed for the secondary battery, a mechanism for drying and compressing the halogen which is generated during charging must be provided for the battery system, and this presents a large obstacle to the construction of the battery. For the purpose of overcoming these drawbacks, methods other than the techniques for directly liquefying the halogen are being researched.

Heretofore, there has been used one method (a complex compound method; IEEE, New York, 1975, p. 1141-1146) in which the halogen is converted into a complex compound with an amine and is stored in a liquid state, and another method (a hydrate method; U.S. Pat. No. 3,713,888) in which the halogen is mixed with water which has been cooled to several degrees centigrade or less and is stored in the form of a solid hydrate such as $Cl_2.6H_2O$ or $Br_2.10H_2O$. These methods involve reactions such as complexing reactions and hydrating reactions, and thus in these cases, to form and decompose a complex or hydrate heat energy corresponding to the heat of each reaction must be eliminated from the system and fed from the outside into the system. Such an elimination or introduction of heat energy would correspondingly adversely affect the efficiency of the battery. As for the hydrate method, the halogen cannot be stored securely, unless water is maintained in a cold state during the storage.

SUMMARY OF THE INVENTION

Therefore, an object of the present invention is to provide a battery in which the electrical power required during the operation of the battery is reduced, so that the total energy efficiency of the battery is improved, and in which a halogen is safely stored in the state of a uniform solution.

Another object of the present invention is to provide a secondary battery in which the halogen is stored by being absorbed in a solvent and is freely released at a desired rate in the discharging of the battery.

Still another object of the present invention is to provide a method for smoothly feeding the halogen absorbed and stored in the solvent.

A further object of the present invention is to provide a battery in which the rate of absorbing the halogen by the solvent in its charge operation is adjusted, so that the halogen is stored without reducing the pressure in the halogen storage tank, and as a consequence, the storage tank always has a normal pressure therein, which fact permits the use of a thin-wall material from the tank, with the result that a lightweight battery can be contemplated.

A still further object of the present invention is to provide a compact battery having a circulating line in which the halogen is effectively dissolved in a less amount of the solvent in its charging operation, and is generated without any trouble and is fed into an electrolyte during its discharge operation.

Other and further objects, features and advantages of the present invention will appear more fully from the following description taken in connection with the accompanying drawings.

BRIEF DESCRIPTION OF THE DRAWINGS

"The present invention will become more fully understood from the detailed description given hereinbelow and the accompanying drawings which are given by way of illustration only, and thus are not limitative of the present invention, and wherein:"

DETAILED DESCRIPTION OF THE INVENTION

According to the present invention, there is provided a battery having a cathode in which a halogen is employed as an active material, the battery being characterized in that the halogen is dissolved in an organic solvent and is stored or fed.

One embodiment of the present invention will be described in reference to FIG. 1 in which the constitution of a secondary battery is exhibited.

Figure 1:
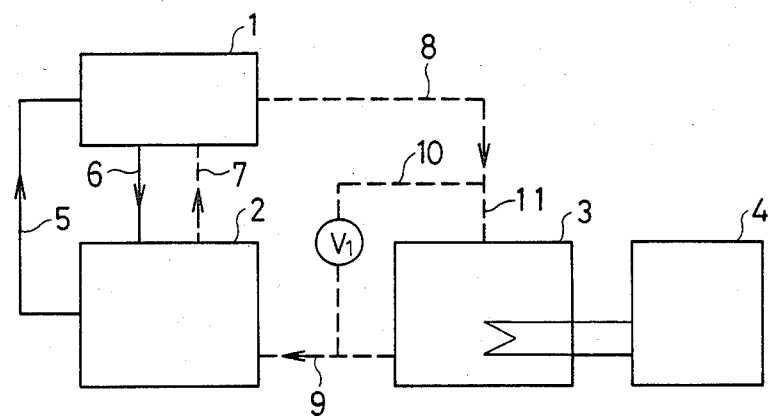
FIG. 1 is an explanatory view illustrating a fundamental embodiment of a secondary battery of the present invention.

The battery is composed of a battery portion 1, an electrolyte portion 2, a halogen storage or feed tank 3 (hereinafter referred simply to as the halogen storage tank), and a solid line and a dotted line in FIG. 1 representing an electrolyte circulating line and a gas circulating line respectively. Further, arrows therein indicate a circulating direction.

The battery portion 1 contains at least one battery comprising an anode and a cathode, and between this battery portion 1 and the electrolyte portion 2 is circulated an electrolyte in which a metallic salt and a halogen are dissolved.

The halogen gas is generated from the battery portion 1 in the changing operation of the battery and is then circulated through the battery portion 1, the halogen storage tank 3 and the electrolyte tank 2, and it is absorbed in the halogen storage tank 3. Lines 7, 8, 9, 10 and 11 serve to circulate this halogen gas therethrough.

When the concentration of the halogen in the electrolyte is too high, a self-dissolving rate of a metal which is generally used as the anode active material is accelerated, resulting in a drop in the battery efficiency. When it is too low, the reaction at the cathode does not take place smoothly. Usually, the concentration of the halogen in the electrolyte is within the range of 0.01 to 3 wt.% or so, preferably 0.05 to 0.5 wt.%. The halogen generated during the charging operation is guided to the halogen storage tank filled with a cooled solvent, and is then absorbed therein. Further, the halogen required in the discharge of the battery may be fed to the battery portion in the following procedure: The solvent containing the halogen in the halogen storage tank is first heated to generate the halogen, the generated halogen is introduced into the electrolyte, a predetermined amount of the halogen is dissolved in the electrolyte, and the halogen is finally fed to the battery portion.

In the present invention, the halogen is absorbed in the stable organic solvent which does not react with the halogen, the halogen generated from the cathode during charging the battery is stored, and the stored halogen is taken out and utilized in the discharge operation thereof. The solubility of the halogen in the organic solvent depends greatly on the temperature. The difference between the solubilities of the halogen at certain temperatures is utilized to accomplish the storage and the absorption of the halogen. As one example, FIG. 2 shows the solubility of chlorine in hexachlorobutadiene at normal pressure.

Figure 2:
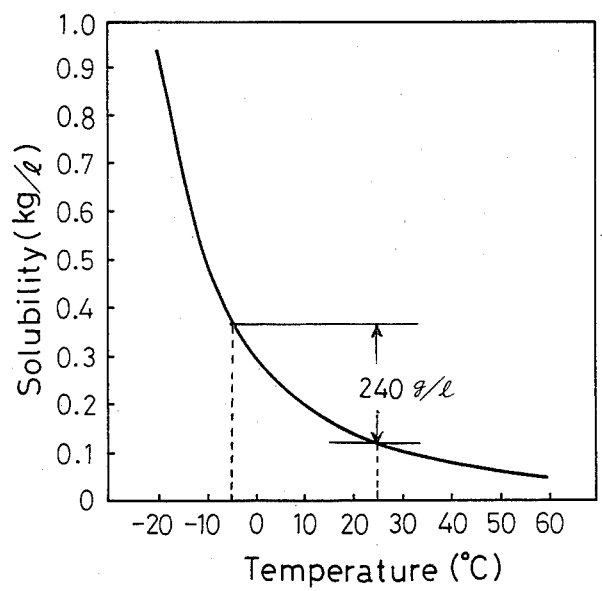
FIG. 2 is a graph showing the solubility of chlorine in hexachlorobutadiene at normal pressure.

In FIG. 2, for example, if chlorine is blown into the solvent which has been cooled to $-5°$ C., the chlorine will be rapidly absorbed and stored therein, and the solvent will become dark yellow. When the temperature of the solvent is gradually raised up to 25° C., 240 g of chlorine per liter of the solvent in which it is dissolved will be theoretically generated in compliance with the difference between the concentrations thereof at the respective temperatures. If the absorption of the chlorine is carried out under elevated pressure, a large amount of the chlorine gas can be absorbed. A solubility curve of the halogen varies with the kind of solvent used but its gradient is substantially similar. Therefore, the kind solvent and the operation temperature can be selected from very wide ranges.

In this method, the halogen is merely dissolved in the solvent, and thus no change in phase occurs. Therefore, the only necessary energy is heat of gasification and thus the energy efficiency of the battery can be improved remarkably when compared to conventional methods involving the reaction and the change in the phase which requires a large energy consumption.

Further, the solvent in which the halogen has already been dissolved maintains a very stable state, even if heated up to a level in excess of the saturation temperature. Accordingly, the solvent containing the halogen can be stably preserved in so far as a stimulation such as the blow of an insoluble gas thereinto is not given. In consequence, it is not particularly necessary that the halogen solution be maintained cold during the storage as the conventional method.

The halogen-absorptive organic solvent used in the present invention preferably satisfies the following properties:

(1) to be capable of dissolving a great deal of the halogen and to have the solubility be largely dependent on temperatures, (2) not to react with the halogen absorbed, (3) not to be dissolved in an electrolyte, (4) not to attack a plastic material which constitute the battery, and (5) to have a low vapor pressure and thus be difficult to introduce into the electrolyte together with the circulating gas.

Optical solvents are usable in the present invention so long as they possess the above mentioned properties, but halogenated organic solvents are particularly preferred. Preferable examples of these solvents include chlorine- or fluorine-substituted hydrocarbons having about 3 to about 8 carbon atoms, and low-molecular polymers (oligomers) of chlorine- or fluorine-substituted unsaturated compounds. The most preferable examples of the organic solvents include hexachlorobutadiene, 2,2-fluorooctachlorobutane and polymers of trifluoromonochloroethylene wherein the degree of polymerization is about 3 to 10.

In the battery of the present invention, an inert gas is preferably circulated in at least the halogen storage portion.

Any of the inert gases are usable in the present invention, in so far as they do not react with the halogen but nitrogen, helium, argon and carbon dioxide gas are usually used. The volume ratio of the inert gas to the halogen gas is within the range of 1:9 to 9:1, preferably 2:8 to 8:2, and most preferably 3:7 to 6:4.

The case where the circulating inert gas is used will be described with reference to FIG. 1. The inert gas is allowed to circulate through the battery, and a necessary amount of the halogen is removed from the halogen storage tank 3 by switching a valve $V_1$. That is, when the halogen is required, the valve $V_1$ is closed so that the circulating inert gas containing a portion of the halogen may be introduced into the solvent containing the dissolved halogen in the halogen storage tank through the line 11, and the halogen is removed by being carried on the circulating inert gas. At this time, the halogen storage tank 3 can be suitably heated by a heating/cooling device 4. After a sufficient amount of the halogen has been fed, the valve $V_1$ is opened so that the circulating inert gas may by-passed through line 10, in other words, so that it is not introduced into the halogen storage tank 3, whereby the release of the halogen can be stopped. This procedure is an important technique in order to prevent the occurrence of a supersaturation phenomenon and to put the method to practical use.

When the storage tank is made from plastic, static electricity is liable to occur and accumulate between the solvent in the tank and the inside surface thereof, while the solvent is stirred by blowing the circulating gas into the storage tank. For the purpose of preventing problems due to such static electricity, it is preferred to take the following procedure in the battery of the present invention: Carbon powder is dispersed in the organic solvent in the halogen storage tank, an anticorrosive metal rod is inserted into the solvent, and an earth wire is connected thereto so as to discharge the static electricity generated therein through the metal rod.

In the present invention, a pressure in the battery can be freely designed but is preferably within the range of 0.5 to 10 atms. The temperature in the battery may be from the freezing point to the boiling point of the electrolyte, but preferably is within the range of 10° to 60° C. This temperature of the solvent at which the halogen is generated depends on the kind of solvent utilized, and it should be maintained at a level higher than its temperature in a saturated condition.

In the present invention, in the case that the halogen is absorbed in the organic solvent having a low temperature, the absorption of chlorine gas can be accomplished by dissolving the halogen in the inert gas and blowing the mixed gas into the solvent. Usually, in the secondary battery, the storage and the feed of the halogen are carried out in a sealed system, and thus these processes are accomplished in the circulating system together with the inert gas.

The storage and the generation rate of the halogen can be controlled by adjusting the flow velocity of the circulating gas which is flowing through the solvent. For the achievement of this adjustment, a by-pass line 10 is provided. The flow rate of the inert gas which is flowing through the other circulating systems of about 1 KW battery is usually within the range of 0.1 to 5 l/min., and such a flow rate condition permits the obtaining of a sufficient effect.

In the battery of the present invention, an upper space (a gaseous phase portion) in the halogen storage tank 3 is preferably filled with a mixture of a halogen gas such as chlorine and the inert gas, since such a constitution prevents a pressure in the halogen storage tank from reducing and permits forming the wall of the tank with a thin-wall material.

The halogen storage tank receiving the halogen absorbing solvent therein is usually a poly(vinyl chloride) tank, the outside surface of which is coated with FRP. However, when the tank is used under conditions that a differential pressure between an internal pressure in the tank and the atmospheric pressure is large, particularly when the internal pressure in the tank is reduced, the tank will be deformed or broken.

In the case of the conventional technique, a 100% halogen gas is introduced into the above mentioned gaseous phase portion, and thus the dissolution of halogen occurs rapidly when the temperature of the solvent is low and a solubility of the halogen is high, with the result that the internal pressure in the solvent tank is reduced.

On the contrary, in the present invention, the gaseous phase portion in the halogen storage tank is filled with the mixed gas of halogen and the inert gas such as helium, and as a consequence, the gaseous phase portion can be maintained at a pressure higher than the partial pressure of the inert gas, because even if all of the halogen gas is absorbed in the solvent, the partial pressure of the inert gas is still maintained because it is not absorbed.

Further, in the case that the chlorine gas is absorbed in the charge operation of this battery, or in the case that the chlorine gas is released in the discharge operation thereof, the inert gas is present in the gaseous phase portion of the halogen storage tank, and thus the fluctuation in the pressure in the solvent tank becomes small, so that the control of the halogen gas can be easily achieved.

In the present invention, a pump may be disposed at a suitable position in the gas circulating system or the liquid circulating system of the battery so as to effectively perform the charge and the discharge of the battery. A preferable example is a battery in which in charging the battery, a halogen generated from the cathode in a battery portion is blown into an organic solvent by means of a gas pump in order to be dissolved and stored therein, and in the discharging the battery, the organic solvent is heated to generate the halogen, and the latter is then dissolved in an electrolyte and is fed to the battery portion for ionization. The battery is characterized in that (1) in the time of the charge of the battery, an inlet port and an exhaust port of the gas pump are connected to a gaseous portion in the battery portion and a gas inlet of a halogen storage tank, repectively; and (2) in the time of the discharge thereof, the inlet port and the exhaust port of the gas pump are connected to the gaseous phase of the solvent and the gas dissolving portion of the electrolyte, respectively.

Figure 3:
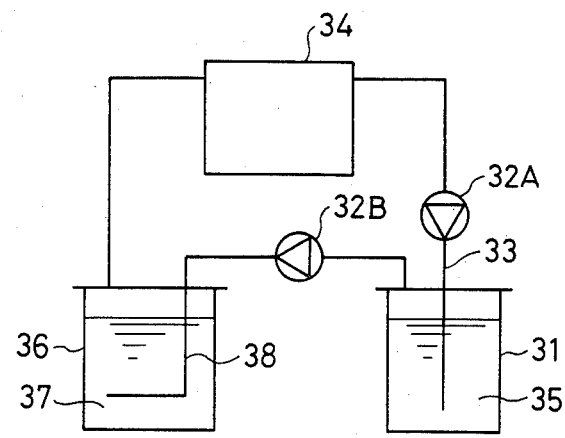
FIGS. 3, 4, 5 and 7 are explanatory views illustrating other embodiments of the secondary batteries according to the present invention.

One embodiment of this battery will be described with reference to FIG. 3. As shown in FIG. 3, an inlet port of a gas pump 32A is connected to a gaseous portion in a battery portion 34, and an exhaust port of the gas pump 32A is connected to a halogen storage tank 31, whereby chlorine generated in the battery portion 34 is dissolved in an organic solvent 35. In this case, the exhaust port of the gas pump 32A is present in the gaseous phase portion in the halogen storage tank 31, and thus this gaseous phase portion is pressurized in order to feed chlorine into the solvent 35, so that the concentration of halogen in the halogen storage tank 31 is heightened, because the solubility of chlorine in the solvent 35 is directly proportional to a partial pressure of chlorine in the gaseous phase portion of the solvent.

Further, at the time of the discharge of the battery, a gas pump 32B disposed between the halogen storage tank 31 and the electrolyte tank 37 is operated and adjusted so as to reduce the pressure ($-0.15$ kg/cm$^2$) in the gaseous portion of the solvent, and the temperature of the halogen storage tank 31 is elevated, resulting in the generation of chlorine from the solvent 35. The thus generated chlorine gas is blown into the electrolyte 38 in the electrolyte tank 37 through a line 39 and is then fed to the battery portion 34, thereby constituting the battery of the present invention.

In such a system, the partial pressure of chlorine in the gaseous phase portion of the solvent is low and therefore chlorine which is dissolved in the solvent can be given off in a larger amount than in the case that the gaseous phase portion of the solvent is at normal pressure.

For a reduction in the pressure on the solvent, it is desirable to enhance the degree of diminished pressure, but when this degree is too high, the solvent tank will be deformed, whereby problems will be introduced into the battery apparatus. As a consequence, a pressure limit of $-0.3$ kg/cm$^2$ is an upper limit which is preferably used.

Figure 4:
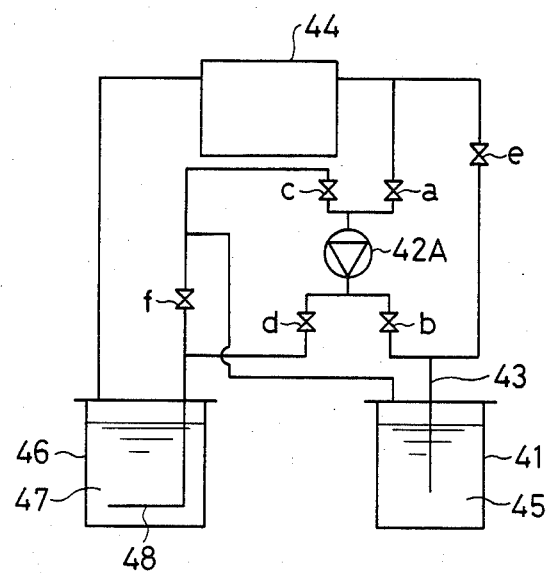

Further, as shown in FIG. 4, one gas pump 42A may be employed and the charge and discharge of the battery may be carried out by switching this gas pump 42A. This is, in charging the battery, chlorine gas from a battery portion 44 is delivered to an inlet port of the gas pump 42A via a valve a, and the chlorine gas is pressurized and then fed to an organic solvent 45 in a halogen storage tank 41 through a valve b and an exhaust port 43, so that the gas is dissolved and stored in the organic solvent 45.

In discharging the battery, the halogen storage tank 41 is heated and the chlorine gas stored in the solvent 45 is delivered to the inlet port of the gas pump 42A via the valve c again. The gas is pressurized by the pump 42A and is then fed to an electrolyte 47 in an electrolyte tank 46 via the line 48 and the valve d.

Valves a, b and f are closed and valves c, d and e are opened in the time of the discharge of the battery, and valves a, b and f are opened and valves c, d and e are closed in the time of the charge thereof.

In the present invention, the organic solvent in the halogen storage tank may be covered with a solution having a specific gravity smaller than the solvent and having a lower halogen solubility than the aforesaid solvent. Such solutions having a lower halogen solubility than the solvent are preferably aqueous solutions each having a freezing point lower than that of the solvent cooled at the time of charging. The preferable solutions for covering the solvent include solutions containing 1 to 3 components selected from zinc chloride, potassium chloride and sodium chloride.

The battery regarding the present invention is constructed in the form of a sealed structure. However, the halogen storage tank and the electrolyte tank are not completely filled with the organic solvent and the electrolyte, respectively, as described above, but on these liquids, there are space portions which are filled with a gas such as chlorine and an inert gas.

The absorbing rate at which the organic solvent absorbs halogen is high, and the amount of absorbed halogen increases along with the fall of its temperature. Therefore, when the temperature of the solvent drops, the halogen present in the space portion in the solvent tank, will also be absorbed, and the pressure in this space portion will be reduced rapidly. As a result, a noticeably large impact force will be applied to the solvent tank.

However, this problem can be solved by providing the surface layer comprising the above mentioned solution, as described above. That is, in the halogen storage tank receiving the organic solvent therein for absorbing the halogen, the surface solution layer mentioned above can prevent gaseous halogen from being dissolved rapidly in the solvent so as not to excessively reduce the pressure in the space portion in the solvent tank.

The aqueous solution which is floated on the surface of the solvent for absorbing halogen should have a freezing point lower than that of the solvent cooled at the time of charging. Because not only will the aqueous solution solidify when the temperature of the solvent is caused to fall, but also a great deal of solidification heat will be given off, which fact will increase the load of a refrigerating machine for cooling the solvent.

In the case that the battery of the present invention is a secondary battery, the material used for electrodes in the secondary battery should be anticorrosive against halogen, and examples of such materials include graphite, plastic carbon and metals such as platinum, gold and titanium coated with a platinum metal.

A metal used as the anode active material is preferably a metal which is smoothly deposited on the surface of the electrode during the charging operation of the battery and which provides a high voltage at the time of the discharge thereof. The most preferable metal is zinc. The most preferable halogens used as a cathode active material are chlorine and bromine. The electrolyte is, as the main components, composed of a salt of the metal used as the anode active material and a salt of the halogen used as the cathode active material. A concentration of these main components is preferably within the range of 5 to 50 wt.%. If necessary, for the purpose of increasing the conductivity of the electrolyte, another metallic salt and/or a dendrite inhibitor may be added thereto.

In the case of a primary battery, examples of useable anode active materials which can be used include zinc and aluminum. Further, for the separation of an anode chamber from a cathode chamber, a membrane may be employed. Examples of the membrane used in this case include a cloth coated with a polytetrafluoroethylene, a polyethylene, an osmotic membrane for selectively allowing ions to permeate therethrough, and the like.

The objects, functions and effects of the present invention will be readily understood from the foregoing description and examples of the present invention described hereinafter. Features of the battery according to the present invention are enumerated below.

(1) The halogen forms neither a hydrate nor a complex compound, so that the introduction of excessive hydration heat or reaction heat to the system does not substantially occur. Accordingly, an energy loss, does not substantially occur in the storage and feeding operation.

(2) Conventionally, the formation or decomposition of hydrate and complex compounds accompanies the cooling or heating of a large amount of water or aqueous solution. On the contrary, the use of the organic solvent for storage greatly decreases the energy loss as compared with water or an aqueous solution although the heating and cooling are still required. The reason for this is that the specific heat of the organic solvent is about 20% less than that of water, resulting in the energy required for heating and cooling the organic solvent being reduced as compared to that for water.

(3) The hydrate or complex compound for the halogen is generally in the form of solid. On the contrary, in the process of the present invention the halogen is merely dissolved in the organic solvent and maintains the form of a uniform solution, even after absorption. This results in the absorption being efficiently carried out throughout which not only decreases power consumption of a gas pump but also facilitates the handling thereof.

(4) The employment of the organic solvent allows the conditions for heating and cooling it to be set at a wide range, so that a large amount of halogen may be absorbed using a small amount of the solvent.

(5) A use of the organic solvent insoluble in water causes moisture contained in the halogen to be separated from the halogen at the time when it is dissolved in the organic solvent, resulting in it being absorbed in the form of an anhydrous halogen. The thus-formed halogen solution is highly reduced in corrosiveness, sufficient to be stored in a metal vessel formed of, for example, iron or the like. Such a characteristic of the solution sllows it to be effectively and conveniently utilized for a primary cell.

(6) Hexachlorobutadiene has a chlorine solubility curve as shown in FIG. 2, from which it is noted that it is capable of dissolving about 0.35 kg/l of chlorine at a temperature of 31 5° C. and about 0.11 kg/l of chlorine at a temperature of 25° C. Accordingly, the reciprocating of a temperature between $-5°$ C. and 25° C. causes the solvent to absorb or supply about 0.24 kg of chlorine. The solvent is $-20°$ C. and 250° C. in melting point and boiling point, respectively, and has a low vapor pressure of about 1 mmHg at a temperature of 25° C., so that the removal of the solvent from the system does not substantially occur at the discharge of halogen gas therefrom.

(7) A plastic material is typically used for the manufacture of a cell. In this connection, the chemical structure of hexachlorobutadiene is that butadiene in the molecule has conjugated double bonds, so that chlorine substituted may substantially lose the function of dissolving or swelling PVC.

(8) The carrying of halogen gas on a carrier gas ensures the flow of halogen gas in the whole system to facilitate the control even when the amount of halogen is substantially varied.

Also, the organic solvent in the absorption tank keeps halogen at a supersaturated state to prevent the generation of halogen even when the temperature of the organic solvent is slowly raised after it absorbs halogen at a low temperature, so long as the gas is not blown into the solvent. Accordingly, when it is desired to keep halogen at a state sufficiently absorbed in the solvent in the absorption tank after charging, the halogen may be safely dissolved and stored in the organic solvent without cooling the solvent, different from the conventional hydrate.

(9) Employment of the system of feeding a mixture of halogen with inert gas into the gas phase to the halogen storage tank, when halogen gas is to be absorbed in the organic solvent, moderates the absorption rate, to thereby prevent a remarkable variation in pressure in the storage tank. This eliminates the necessity of providing the storage tank with pressure resistance and renders the tank light-weight. Also, this has another advantage of facilitating the control of the halogen gas.

(10) A decrease in pressure of the gas phase in the solvent tank by means of the gas pump particularly at discharge, facilitates the generation of halogen gas from the solvent which dissolves halogen therein. This greatly decreases the amount of the solvent required and renders the solvent tank compact. Also, such a decrease in the amount of the solvent significantly reduces the power consumption required to cool the solvent to a low temperature in the absorption and dissolving of halogen gas in the solvent.

(11) The floating of an aqueous solution which absorbs halogen and which does not cause freezing even at the lowest temperature of the solvent, on the surface of the solvent, decreases a rate of absorption of halogen in the solvent, thereby constantly carrying out stable charging and discharging.

(12) Problems caused by static electricity can be overcome by dispersing carbon powder in the organic solvent in the halogen storage tank and inserting therein a halogen-resistant metal rod, to which an earth wire is connected, so as to collect the static electricity generated therein.

EXAMPLES

The present invention will be described with detail in reference to the following examples, which are merely embodiments of the present invention and thus are not intend to limit the scope of the present invention.

EXAMPLE 1

Figure 5:
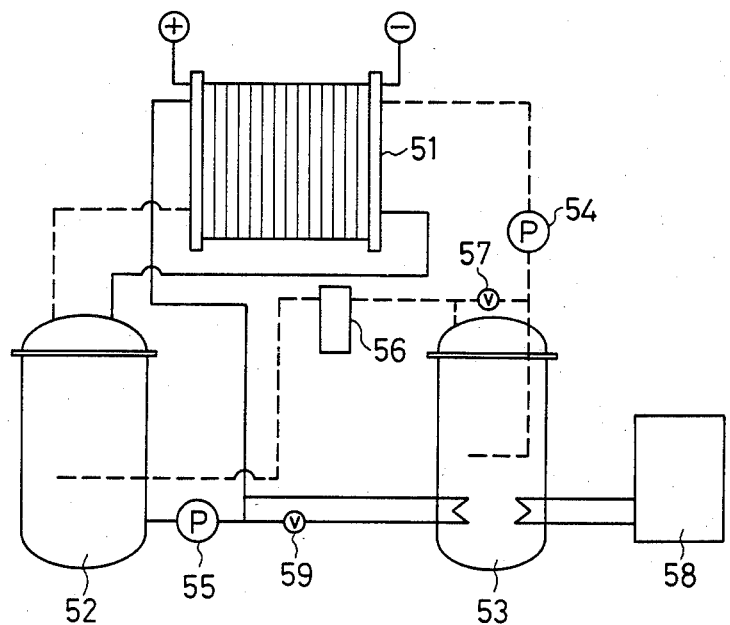

Chlorine and zinc were used as a cathode active material and an anode active material, respectively, and a secondary battery shown in FIG. 5 was constructed. A solid line and a dotted line in FIG. 5 represent an electrolyte circulating line and gas circulating line respectively. Each portion of the battery was constructed as follows.

Battery portion 51 ... A battery comprising 30 cells which were connected in series, each of the cells being composed of a cathode made from a porous graphite and an anode made from a dense graphite and having an effective area of 320 $cm^2$. The battery being capable of charging and discharging at an output of 500 W for about 8 hours.

Electrolyte tank 52 ... A plastic vessel equipped with openings for liquid circulation, for gas blow and for gas circulation and a heat exchanger for adjusting a temperature of the electrolyte, and having a volume of 50 liters.

Chlorine storage tank 53 ... A plastic vessel equipped with a gas blow opening, a gas exhaust outlet and a heating and cooling heat exchanger for adjusting a liquid temperature, and having a volume of 50 liters.

Gas pump 54 ... A bellow type gas pump having a 65 W electric motor.

Electrolyte pump 55 ... A seal type liquid pump having a 65 W electric motor.

Trap 56 ... A trap for trapping an organic solvent forwarded on a circulating gas.

Valve 57 ... A valve for switching the stream of the circulating gas.

Cooling device 58 ... Device to cool the organic solvent.

Valve 59 ... A valve for switching the stream of the electrolyte partially to the pipe in chlorine storage tank.

In the battery constructed using the above mentioned equipments, 40 l of 2 mol aqueous zinc chloride solution was used as an electrolyte, and 35 l of hexachlorobutadiene was used as an organic solvent for storing a chlorine gas therein.

A mixed gas of 50 vol.% of nitrogen and 50 vol.% of chlorine was circulated through the battery portion 51, the gas storage tank 53 and the electrolyte tank 52 by means of the gas pump.

The hexachlorobutadiene liquid in the gas storage tank was adjusted to 20° C., and a chlorine gas was circulated while being fed from the outside so that the liquid might be saturated with the gas. Afterward, the liquid was cooled to −5° C. and charging was carried out at a charging power of 500 W for 8 hours. The chlorine gas generated during this operation was blown and absorbed into the hexachlorobutadiene liquid in the gas storage tank 53. The heat which occurred during the absorption was eliminated therefrom to the outside by driving a heat exchanger (not shown).

Immediately after 8 hours' charging had been completed, discharging was then carried out at an output of 450 W. Chlorine consumed on the cathode was supplemented by gradually raising a temperature of the gas storage tank 53 by introducing the stream of the electrolyte partially to the pipe in gas storage tank 53 utilizing valve 59 and switching the valve 57 so that a mixing ratio of nitrogen to chlorine might always be maintained at 50:50 in a volume ratio.

Discharging was carried out continuously for 7 hours and 50 minutes, and at this time, control could be accomplished very satisfactorily. The final temperature of the gas storage tank 53 was 20° C. An energy efficiency of the battery was 75%. With regard to the power consumed by the auxiliary machinery for one cycle operation of the battery, 225 Wh, 375 Wh and 250 Wh were consumed by the cooling device, the gas pump and the liquid pump, respectively.

COMPARATIVE EXAMPLE 1

The same battery as in Example 1 was used and the same procedure as in Example 1 was repeated with the exception that hexachlorobutadiene was replaced with 40 l of water. In this case, water was cooled to 0° C. at the beginning of charging, and generated chlrorine was blown into the cooled water together with a circulating nitrogen gas. The heat generated with the production of a hydrate during this operation was eliminated therefrom by driving a cooling device. The blown chlorine was converted into the solid hydrate and was deposited. Afterward, discharging was carried out at 450 W for 7 hours and 57 minutes. For chlorine required at this time, there was alloted chlorine generated by gradually raising a temperature of the gas storage tank 53 to decompose the hydrate. An energy efficiency was 76%. With regard to the power consumed by the auxiliary machinery for one cycle operation of the battery, 610 Wh, 200 Wh and 250 Wh were consumed by the cooling device, the gas pump and the liquid pump, respectively.

Comparing the results of Example 1 with those of Comparative Example 1, it will be understood that the battery of the present invention permits remarkably reducing the consumed power of the cooling device and the gas pump. The reason why the consumed power of the gas pump was diminished is that chlorine was well absorbed by hexachlorobutadiene and thus an amount of chlorine to be circulated during charging could be reduced.

EXAMPLE 2

The same battery as in Example 1 was used, and in place of hexachlorobutadience, 35 l of an oligomer of 1-mono-chloro-1,2,2-trifluoroethylene having an average molecular weight of 500 to 900 were placed in the chlorine storage tank. Further, 500 g of a 250 mesh graphite powder were added thereto. Charging was carried out at 500 KW for 3 hours. During this operation, nitrogen and chlorine which were components of a circulating gas were maintained at a volume ratio of 50:50. The solvent in the storage tank was stirred by the circulating gas and had a black color on the whole. Afterward, discharging was carried out at 450 KW for 2 hours and 58 minutes. An energy efficiency was 76%.

EXAMPLE 3

Figure 6:
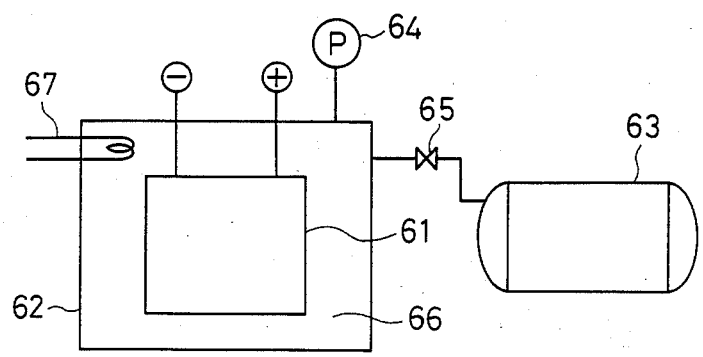
FIG. 6 is an explanatory view illustrating another embodiment in which the present invention is applied as a primary battery.

FIG. 6 shows a schematic view of a primary battery.

A porous graphite and a rolled zinc sheet were employed as a cathode and an anode, respectively. Each electrode was composed of 10 cells connected in parallel and 3 cells connected in series each having an effective area of 100 cm$^2$. A battery portion 61 was composed of these electrodes. The battery portion was placed in an airtight container for battery and the termials for both the electrodes were taken out of the container. The thus constituted battery portion 61 was received in a 25-cm-long, 30-cm-wide and 40-cm-high iron vessel 62 which had been lined with a plastic, thereby forming an electrolyte portion 66. This iron vessel 62 was equipped with a gas blow opening, an electrolye introduction opening, a pressure gauge 64, a pressure relief valve 65 and a hydrogen gas reaction 67. The gas blow opening was connected to a 3-l chlorine gas storage iron tank 63 via a constant pressure valve 65. Three kilograms of 2,2-difluorooctachlorobutane were placed in the chlorine gas storage tank 63, and chlorine was dissolved therein till its saturation had been reached at a pressure of 5 kg/cm$^2$. In this case, about 1 kg of chlorine was dissolved in the liquid. Twenty liters of an electrolyte comprising 1 mol/l zinc chloride and a 3 mol/l supporting electrolyte were introduced into the electrolyte portion 66.

The constant pressure valve of the chlorine gas storage tank 63 was set to 1 kg/cm$^2$G, and the chlorine gas was delivered from the chlorine storage tank to the electrolyte portion 66. Discharging of the battery was carried out at about 100 W for 2 hours, and the valve 65 was closed to shut the electrolyte portion 66 off from the gas storage tank 63 and the discharging operation was continued until almost all electromotive force had been lost. Such an operation could be performed intermittently. This primary battery had a capacity of substantially 1,000 Wh.

EXAMPLE 4

Figure 7:
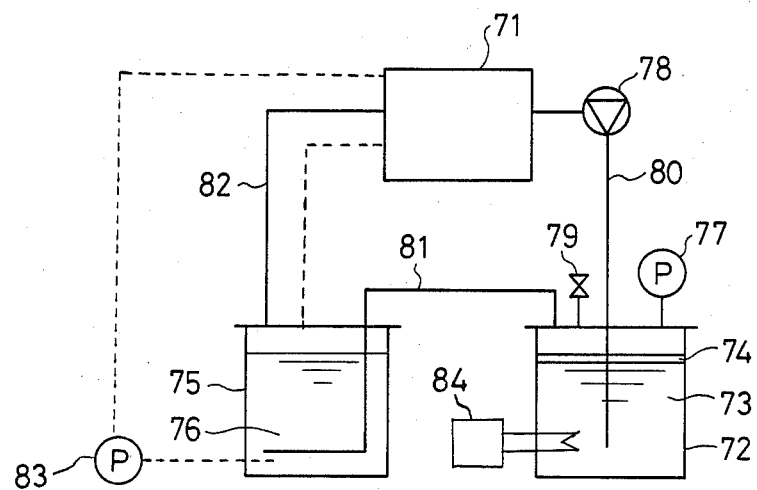

As shown in FIG. 7, two blocks each comprising 15 cells laminated in series were connected in parallel to each other in order to form an electrode portion 71, each cell having an effective area of 1,100 cm$^2$. The thus constructed electrode portion 71 was connected to a 100-l chlorine storage tank 72 via a pipe 80 attached with a gas pump 78, the storage tank 72 receiving 70 l of hexachlorobutadiene 73. A chlorine gas given off from the chlorine storage tank 72 was fed into an electrolyte 76 in an electrolyte tank 75 via a pipe 81. Another pipe 82 was arranged between the electrolyte tank 75 and the electrode portion 71 so as to connect them to each other. The solvent in the chlorine storage tank is cooled or heated by cooling/heating device. Electrolyte is circulated between electrolyte tank 75 and electrode portion 71 by liquid pump 83.

Further, 3 l of an aqueous solution 74 comprising 2 mol/l of zinc chloride, 1 mol/l of potassium chloride and 3 mol/l of sodium chloride was caused to float on the surface of the above mentioned hexachlorobutadiene solvent 73, thereby forming a 1 kW zinc chloride battery of the present invention.

In the thus constructed zinc chloride battery of the present invention, a gaseous phase in the chlorine storage tank 72 was replaced with a gas composed of 50 vol.% chlorine and 50 vol.% helium at normal pressure, and charging and discharging were then carried out.

That is, in the charge operation, the hexachlorobutadiene liquid 73 was maintained at −5° C., and a generated chlorine gas was delivered from the electrode portion 71 into the hexachlorobutadiene liquid 73 by the gas pump 78 and was dissolved therein, while a pressure of the gaseous phase was detected by a pressure gauge 77. When a value of the pressure gauge 77 was less than a predetermined value, the gas pump 78 was stopped and a feed of the chlorine gas from the electrode portion 71 was adjusted. Under such conditions, charging was carried out for 8 hours. A width of pressure fluctuation was as small as ±0.02 kg/cm$^2$.

What is claimed is:

1. An improved secondary battery composed of a battery comprising an anode, cathode and electrolyte tank for feeding an electrolyte to said battery and a halogen storage tank containing an organic solvent for absorbing the said halogen as a cathode active material, wherein the halogen storage tank is connected to said electrolyte tank through a gaseous phase, so that during its charging operation, the halogen gas generated from the battery is delivered into the halogen storage tank where it is stored therein by being absorbed in the organic solvent disposed therein, and during its discharging operation, the halogen gas is delivered from said halogen storage tank into said electrolyte tank where it is dissolved in the electrolyte which is to be delivered to the battery.

2. The secondary battery as claimed in claim 1, wherein an inert gas is circulated through the circuit consisting of said battery, said halogen storage tank and said electrolyte tank, so that, during its charging operation, the generated halogen gas is carried from the battery into said halogen storage tank by said circulating inert gas and is stored therein, and during its discharging operation, the halogen gas is carried from said halogen storage tank into said electrolyte tank by said circulating inert gas.

3. The secondary battery as claimed in claim 1, wherein in its charging operation the halogen gas is stored by absorption in the organic solvent in said halogen storage tank by cooling said organic solvent, and in its discharging operation, the halogen gas is released from the organic solvent and delivered to said electrolyte tank by heating the solvent.

4. The secondary battery as claimed in claim 1, wherein chlorine and/or bromine is used as the active halogen material.

5. The secondary battery according to claim 4, wherein chlorine is used as the active material.

6. The secondary battery as claimed in claim 1, wherein a halogenated organic solvent is used as the organic solvent.

7. The secondary battery as claimed in claim 6, wherein hexachlorobutadiene is used as the halogenated organic solvent.

8. The secondary battery as claimed in claim 2, wherein the volume of the inert gas and the halogen gas in said inert gas containing the halogen is within the range of 1:9 to 9:1.

9. The secondary battery as claimed in claim 2, wherein the amount of the circulating inert gas is adjusted to control the rates of the storage and the feed of the halogen.

10. The secondary battery as claimed in claim 1, wherein a carbon powder is disposed in the solvent and an electricity-collecting rod is inserted in the solvent in said halogen storage tank to prevent the solvent from being charged with static electricity.

11. The secondary battery as claimed in claim 1, wherein the organic solvent in the halogen storage tank is covered with a solution having lower chlorine solubility than said solvent to prevent said solvent from being evaporated.

12. An improved primary battery comprising, a battery in which a halogen is used as an active material, an electrolyte tank and a halogen storage tank for storing the organic solvent wherein the gas phase of the halogen tank is connected to the gas phase of the electrolyte tank, wherein during its discharge-operation, said halogen gas is delivered from the halogen storage tank to said electrolyte tank.

13. The primary battery as claimed in claim 12, wherein said halogen gas is said halogen storage tank is released by heating said halogen tank.

14. The primary battery as claimed in claim 12, wherein a halogenated organic solvent is used as the organic solvent.

15. The primary battery as claimed in claim 12, wherein the halogen gas absorbed and stored in said organic solvent is removed therefrom and delivered to the electrolyte tank.

16. The primary battery as claimed in claim 12, wherein chlorine is used as the halogen gas.

* * * * *